Feb. 10, 1953 R. N. HIMMEL 2,628,270

ELECTRICAL PLUG IN ASSEMBLY

Filed April 29, 1950

INVENTOR
Robert N. Himmel
BY Morris L. Rabkin
ATTORNEY

Patented Feb. 10, 1953 2,628,270

UNITED STATES PATENT OFFICE 2,628,270

ELECTRICAL PLUG-IN ASSEMBLY

Robert N. Himmel, Collingswood, N. J., assignor to Radio Corporation of America, a corporation of Delaware Application April 29, 1950, Serial No. 158,973

6 Claims. (Cl. 175—298)

Figures 1, 2, 3:
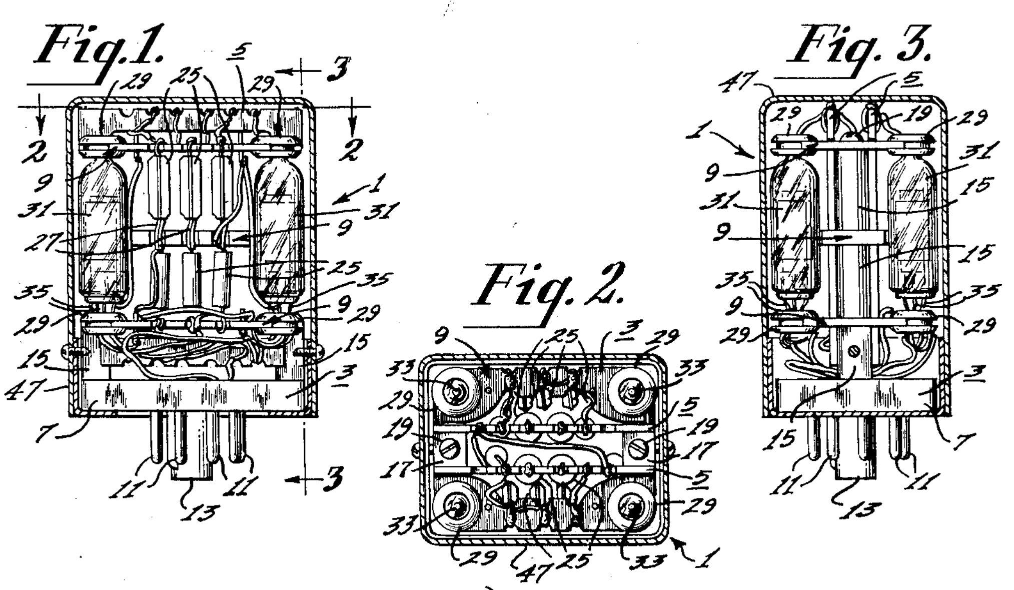

The present invention relates to an improved assembly for electrical components, and more particularly to an electrical assembly of the plug-in type.

In the use of electrical apparatus in many applications, it is often important that loss of operating time be kept to a minimum. This is particularly true in the case of radio apparatus, for example, and applies also to many forms of electronic control apparatus. Breakdowns in such apparatus are usually due to failure of one or more circuit components. Before the apparatus can be restored to normal operation, it is generally necessary to remove the defective component and replace it with an operative unit. However, many types of modern electronic apparatus utilize circuits of extreme complexity and the usual type of wiring results in a maze of leads and junctions. Another problem which frequently presents itself with regard to electronic apparatus design is the necessity of confining highly complex circuit arrangements in a minimum of space. These two problems often combine to produce a situation where some of the circuit components are partially concealed behind other components and wires. Replacement of components is thus doubly complicated, first, by the difficulty of conducting tests to locate the defective part, and second, by the difficulty in separating one small unit from the wiring maze.

In the present invention, the above mentioned disadvantages are obviated by providing an improved sub-assembly of components which, although accommodating a large number of components in a minimum of space, enables quick and easy replacement of any one part.

A primary object of the present invention is to provide a compact electrical assembly which can be quickly and easily replaced.

Another object of the present invention is to provide an electrical assembly unit of the plug-in type which facilitates replacement of defective units.

An additional object of the present invention is to provide an electrical unit which permits maximum space utilization.

Still another object of the present invention is to provide an electrical assembly in which each component is freely accessible for replacement.

A further object of the present invention is to provide a plug-in assembly which is highly efficient and simple to construct at a minimum of cost.

The improved structural unit of the present invention comprises, in general, a plurality of frame members mounted in spaced, parallel relation to each other along a common central axis. These frame members are, generally speaking, polygonal in shape, but may be ovate, annular, or of any other suitable shape. Means are provided on these frame members for mounting a plurality of circuit components. The circuit components may, for example, comprise vacuum tubes, resistors, and capacitors which may be connected in circuits as desired. Means are also provided on the frame members for slidably receiving other removable frame members in transverse relation to the first mentioned frame members. The transversely disposed members constitute sub-assemblies which are adapted to support additional circuit elements for interconnection as desired.

Figure 4:
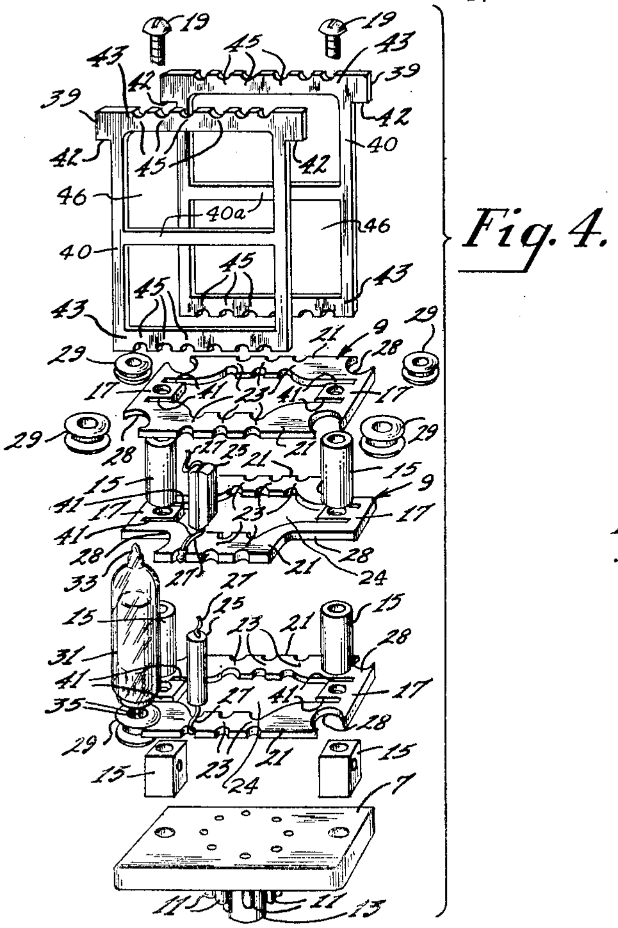
Figure 5:
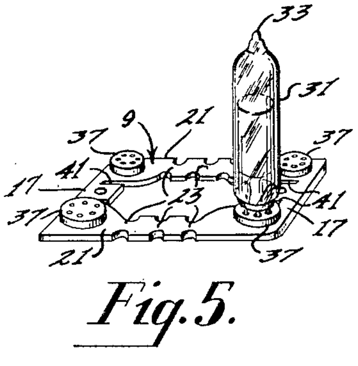

The novel features characteristic of the present invention, as well as additional objects and advantages thereof, will be better understood from the following detailed description when read in connection with the accompanying drawing in which:

Figure 1 is a front elevation of an electrical assembly in accordance with the present invention, the cover being shown in section, Figure 2 is a plan view, partly in section, taken along the line 2—2 of Figure 1, Figure 3 is a side elevation, partly in section, taken along the line 3—3 of Figure 1, Figure 4 is an exploded, perspective view of the assembly shown in Figure 1 without the cover, the parts being shown prior to assembly and only a few of the electrical components being illustrated, and Figure 5 is a perspective view of a frame member, according to my present invention, provided with vacuum tube sockets.

Referring more particularly to the drawing, wherein similar reference characters designate corresponding parts throughout, there is shown an electrical unit or assembly 1, in accordance with one form of the present invention. The electrical structure or unit 1 comprises a main assembly 3 and one or more sub-assemblies 5.

The main assembly 3 includes a base or support 7 and a plurality of endless, supporting frame members 9 of suitable dielectric material, such as a phenolic material, and of any desired or convenient shape. The under side of the base support 7 is provided with a plurality of parallel tube prongs 11 constituting terminal connections for the assembly, and a central, keyed, male member 13, all adapted to be inserted into a correspondingly formed socket (not shown). On the opposite side of the base support 7, the frame members 9 are mounted in parallel, spaced relation along a common, central axis. The frame members 9 are spaced apart by spacing members 15 of suitable dielectric material disposed centrally with respect to the frame member, rib-like side ends 17. Bolts, screws, or other appropriate fastening members 19 are inserted through apertures in the frame members 9 and spacing members 15 and fastened to the base support 7. Thus, the frame members 9 are supported, one above the other in spaced horizontal, parallel planes when the assembly 1 is mounted in an upright position.

Opposite rib-like sides 21 of the frame members 9 are cut-away at intervals along their edges to provide narrow strips or portions 23. The opposite elongated sides 21 and the frame member, rib-like sides or ends 17 of the frame 9 define a relatively large through opening 24 in the frame 9, as shown in Fig. 4. Electrical components 25 are mounted around the outside of the main assembly 3 and supported between adjacent upper and lower frames 9. The components 25 are fastened to the frame members 9 by having their leads 27 wrapped around the narrow portions 23. The narrow portions 23 of adjacent upper and lower frames are aligned so that the components 25 will be disposed side by side in tiers. By wrapping the leads 27 around the narrow frame portions 23, convenient terminals are provided for connecting the components in accordance with an electrical circuit.

If the electrical circuit for which the particular unit is designed requires the use of vacuum tubes, the tubes are mounted in the corners of the main assembly 3. As shown in the drawing, the corners of the frame members 9 are cut away to provide openings 28. The corner openings 28 are semicircular and of a shape to receive and securely hold a rubber grommet mounting member 29 inserted therein from the edge of the frame members. Grommets disposed in corresponding corners of upper and lower frame members 9 support vacuum tubes 31 in a vertical position with their tip ends 33 held in place by the upper grommets and their leads 35 extending through the lower grommets. However, if the vacuum tubes are of a type which requires the use of a tube socket, the bottom frame member 9 need not be cut away at the corners. Instead, tube sockets 37 are mounted adjacent the frame member corners, as shown particularly in Figure 5.

The sub-assemblies 5 comprise rectangular frame members 39 of suitable dielectric material. The rectangular frame members 39 comprise elongated vertical sides or ribs 40 substantially parallel to each other, looking at Fig. 4. The ribs 40 may be interconnected to each other by a transverse rib 40*a*. Slots or channels 41 are provided on the inner peripheries of the ends 17 of the spaced, parallel frame members 9 for slidably receiving the sub-assembly frame members 39 in transverse relation thereto.

In order to support the members 39 within the frame members 9, shoulders 42 are provided adjacent one end at opposite sides of each member 39. The shoulders 42 are arranged so that they can rest upon opposite ends 17 of the top frame member 9. However, other suitable supporting means may be provided. For example, if the wires used to provide connections between components on main and sub-assembly frames are sufficiently stiff, they may be relied upon to provide the necessary support. The frame members 39 also have opposite ribs or ends 43 cut away to provide narrow portions 45 around which leads 27 of other electrical components 25 may be wound. In this case, the components are mounted between opposite ends 43 of each frame member 39. The rectangular frame members 39, including their ribs 40, 40*a* and opposite ribs or ends 43, define relatively large through openings 46 in the subassembly 5, as shown in Fig. 4.

In assembling the structure, the electrical components 25 are mounted separately and, insofar as possible, the wiring on the main assembly 3 and sub-assemblies 5 is completed prior to combining the assemblies. After inserting the sub-assemblies 5 in the slots 41, wiring between the components of the main assembly and the sub-assemblies is completed. If desired, a cover 47 may then be disposed around the unit 1 to protect the parts or provide necessary shielding.

From the foregoing, it is obvious that the present invention provides a compact electrical unit. The plug-in feature facilitates replacement of the entire unit and reduces loss of operating time. The location of the electrical components around the outside of the main assembly is convenient for replacement and repair. Those components mounted on the sub-assemblies are readily accessible after disconnecting a few wires to enable sliding the sub-assembly from the main assembly. The sub-assembly is then either replaced by another sub-assembly or the defective part replaced and the sub-assembly remounted in the main assembly. Thus, there has been provided a mounting means by which a large number of connected circuit components may be disposed within a minimum space and in which each part is readily accessible for replacement or repair.

It will be recognized by persons skilled in the art that various modifications and changes apart from the particular form of the present invention described herein are possible. For example, all of the electrical components of a particular unit may be mounted on sub-assembly frame members without mounting any components on the frame members of the main assembly. In other cases, different fastening means may be provided on the frame members for providing convenient wiring terminals for the electrical components. Therefore, it is desired that the particular forms of the present invention described herein shall be considered as illustrative and not as limiting.

What is claimed is:

1. A structure for supporting electrical components comprising a plurality of flat frame members, means for mounting certain ones of said frame members in spaced, parallel relation to each other, said certain frame members being formed with openings and with channels communicating with said openings for slidably receiving the remainder of said frame members, said channels being aligned and arranged to support said remainder frame members in transverse relation to said certain frame members.

2. A structure for supporting electrical components comprising a plurality of flat frame members, means for mounting certain ones of said frame members in spaced, parallel relation to each other, each of said certain frame members having rib-like sides defining an opening with oppositely disposed channels on the inner periphery thereof, said channels being aligned and arranged for slidably receiving the remainder of said frame members within the openings of and in transverse relation to said certain frame members.

3. A structure for supporting electrical components having leads extending therefrom, said structure comprising a plurality of frame members, each of said frame members comprising a plurality of rod-like sides defining an opening means for mounting certain ones of said frame members in spaced, parallel relation to each other, and means on said certain frame members for supporting the remainder of said frame members in transverse relation to said certain frame members, each of said frame members having certain of said sides formed with relatively narrow portions at spaced intervals for attaching said leads to said frame members thereby to support said components.

4. A structure for supporting electrical components, said components including at least one vacuum tube, said structure comprising a plurality of frame members, means for mounting certain ones of said frame members in spaced, parallel relation to each other, said certain frame members being polygonal and having elongated sides defining an opening, said certain frame members being provided with mounting means at corresponding corners thereof for supporting said vacuum tube between separate ones of said certain frame members, and means on said certain frame members for slidably receiving and supporting the remainder of said frame members within the openings of and in transverse relation to said certain frame members.

5. An electrical unit comprising, in combination, a main assembly and at least one sub-assembly, said main assembly comprising a plurality of flat frame members, each of said frame members comprising rib-like sides defining an opening, means supporting said frame members in spaced, parallel relation one above the other, means on said sides of said frame members for attaching electrical components between two adjacent frame members, said sub-assembly comprising another frame member having rib-like ends and means thereon for attaching other electrical components thereto, said frame members of said main assembly having means for slidably receiving said sub-assembly frame member for disposition transversely to said frame members and within the openings thereof.

6. An electrical unit according to claim 1 wherein said main assembly is provided with means for attaching said unit to an electrical socket.

ROBERT N. HIMMEL.

REFERENCES CITED

The following references are of record in the file of this patent:

UNITED STATES PATENTS

| Number | Name | Date |
|---|---|---|
| 1,719,456 | Sterba | July 2, 1929 |
| 2,076,771 | Eastman | Apr. 13, 1937 |
| 2,226,745 | Shrack | Dec. 31, 1940 |
| 2,314,225 | Leece | Mar. 16, 1943 |
| 2,438,454 | Riebe | Mar. 23, 1948 |
| 2,440,308 | Storck | Apr. 27, 1948 |
| 2,500,301 | Tresise | Mar. 14, 1950 |